United States Patent [19]

Gough

[11] Patent Number: 4,722,433

[45] Date of Patent: Feb. 2, 1988

[54] CONVEYOR OR ELEVATOR SYSTEM

[75] Inventor: George T. Gough, Charlotte, N.C.

[73] Assignee: Gough Econ, Inc., Charlotte, N.C.

[21] Appl. No.: 759,268

[22] Filed: Jul. 26, 1985

[51] Int. Cl.⁴ .............................................. B65G 47/40
[52] U.S. Cl. .................................... 198/706; 198/710; 198/712
[58] Field of Search ............... 198/703, 706, 707, 710, 198/712, 800, 708

[56] References Cited

U.S. PATENT DOCUMENTS

| | | | |
|---|---|---|---|
| 776010 | 11/1904 | Bousse | 198/710 X |
| 1,556,343 | 10/1925 | Philips | 198/710 X |
| 2,729,531 | 1/1956 | Andersen | 198/710 X |
| 3,145,829 | 8/1964 | Janouschek et al. | 198/706 |
| 3,199,658 | 8/1965 | Graber et al. | 198/800 |

FOREIGN PATENT DOCUMENTS

| | | | |
|---|---|---|---|
| 221415 | 4/1920 | Fed. Rep. of Germany | 198/710 |
| 592358 | 9/1947 | United Kingdom | 198/708 |
| 899400 | 1/1982 | U.S.S.R. | 198/706 |

*Primary Examiner*—Joseph E. Valenza
*Assistant Examiner*—Jonathan D. Holmes
*Attorney, Agent, or Firm*—W. Thad Adams, III

[57] ABSTRACT

A bucket elevator includes a continuous driven chain supporting inter-engaging buckets on swinging links. The links carry rollers which travel along guidance tracks which diverge from the track which guides the chain. Thus, the buckets pass around a curve of greater radius than the chain due to movement of the swinging links and will separate from each other while remaining horizontal.

8 Claims, 9 Drawing Figures

CONVEYOR OR ELEVATOR SYSTEM

TECHNICAL FIELD AND BACKGROUND OF THE INVENTION

This invention relates to a conveyor or elevator system of the type that comprises a series of buckets supported by a driven chain or cable to move the buckets along a predetermined path. It is desirable in such systems to have the buckets arranged close together and very often the buckets are interlocked or overlapped.

It is also desirable to enable the buckets to be maintained in a substantially horizontal attitude at all times.

When the buckets go round corners or negotiate turns, horizontally or vertically, if the buckets are interlocked or overlapped or even if they are very close together there is a tendency for the buckets to tip.

SUMMARY OF THE INVENTION

Therefore, it is an object of the invention to provide an elevator or conveyor system in which this difficulty is overcome and in which the buckets may be arranged to assume a horizontal attitude at all times.

In accordance with the present invention an elevator or conveyor system comprises a series of buckets supported by a driven chain or cable along a predetermined path, the buckets being supported on the chain or cable by means of individual swinging links, guidance means being provided at curves or bends in the path to cause the links to swing outwardly away from the chain or cable so that the buckets in turn move outwardly and follow a curve of greater radius than the radius of the curve or bend in the path, whereby the buckets are spaced further apart when going round a curve or bend than when they are proceeding along a straight portion of the path.

Preferably the buckets are arranged to be very close together or touching or overlapping or even interlocked along the straight portions of the path but to separate when the buckets go round a curve or bend.

Preferably the buckets are maintained in a substantially horizontal attitude at all times.

Preferably each link is provided with a cam follower or roller engaged in a track which normally runs parallel to the path of the chain or cable along the straight sections but is diverted outwardly away from the chain or cable at curve sections.

If a chain is employed it may have rollers or wheels at intervals along its length to engage a track to guide the chain.

Means may be provided to empty the buckets comprising a cam located alongside the path of the chain or cable and a corresponding cam follower on each bucket to cause the bucket to tip and empty when the cam follower engages the cam.

From another aspect a bucket elevator comprises a plurality of buckets carried by individual links pivoted on a driven chain arranged to follow a path comprising straight and curved sections, each link having a cam follower or roller engaged in a guide track having sections which divert the cam followers or rollers away from the normal path of the chain or cable at bends in that path so that the links will be caused to pivot and thus move the buckets away from the path of the chain or cable whereby the buckets follow a curve of greater radius than the chain or cable at said bends.

Preferably each of the swinging links is connected to a bucket by means of a bucket pin and the pin carries the roller. The rollers which are employed for chain guidance may be carried on a shaft which performs the additional function of acting as the pivot point for the swinging link where it is pivoted to the chain. The shaft may pass through a pair of links and form the means of hinging the links together.

The invention is preferably applied to a bucket elevator of the self-contained type which is provided with a loading station and an unloading station and a driven chain having a vertical or inclined section so as to raise the buckets from the loading station to the unloading station.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT

Figure 1:
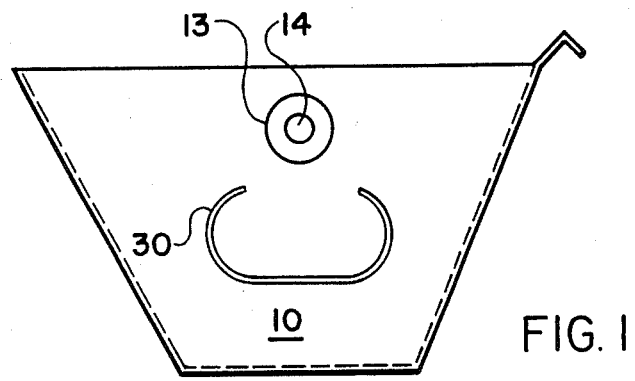
FIG. 1 is an end elevation of an elevation bucket for use with an elevator or conveyor system in accordance with the invention.
Figure 2:
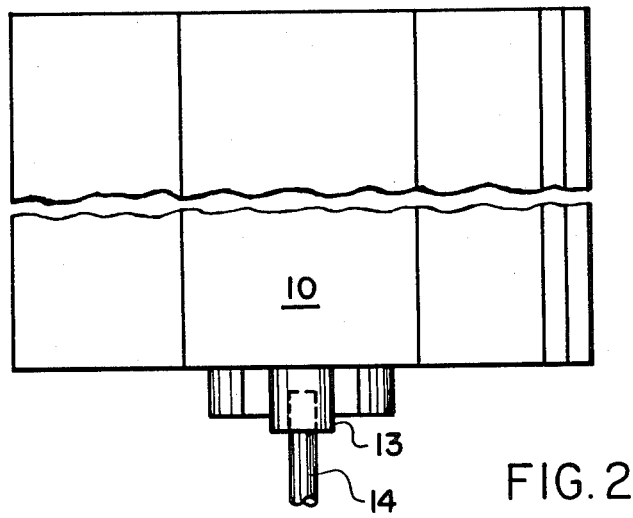
FIG. 2 is a fragmentary plan view of the bucket shown in FIG. 1.
Figure 7:
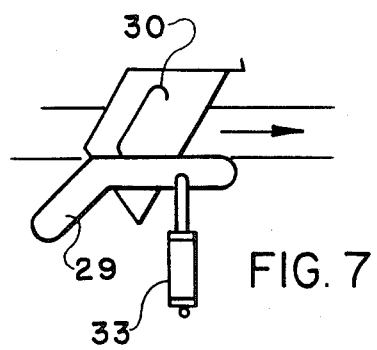
FIG. 7 is an enlarged, fragmentary view of the bucket discharge ramp shown in FIG. 4.
Figure 3A:
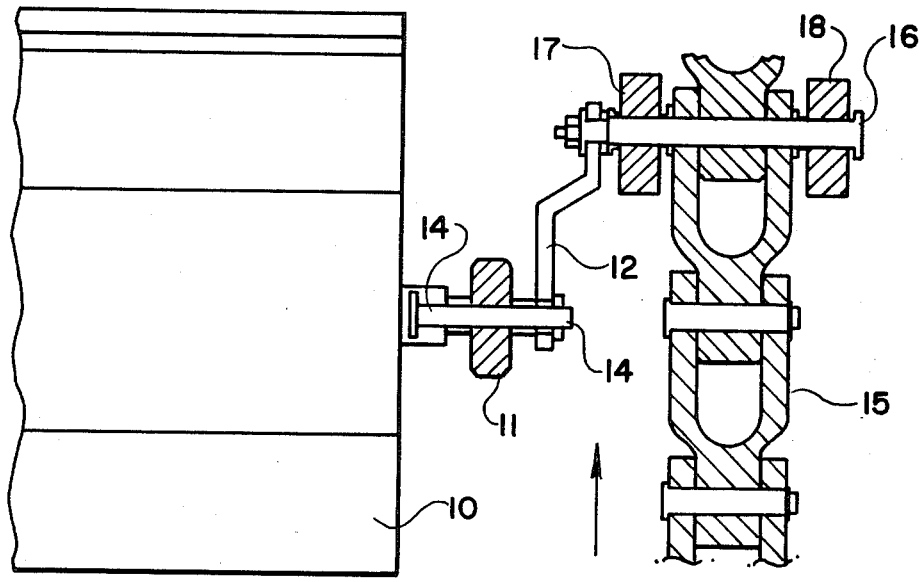
FIG. 3A is a horizontal section through a portion of a chain of a bucket elevator and shows the way in which each bucket is pivoted to the chain by a swinging link and FIG. 3B is a corresponding side elevation of the chain and bucket.
Figure 3B:
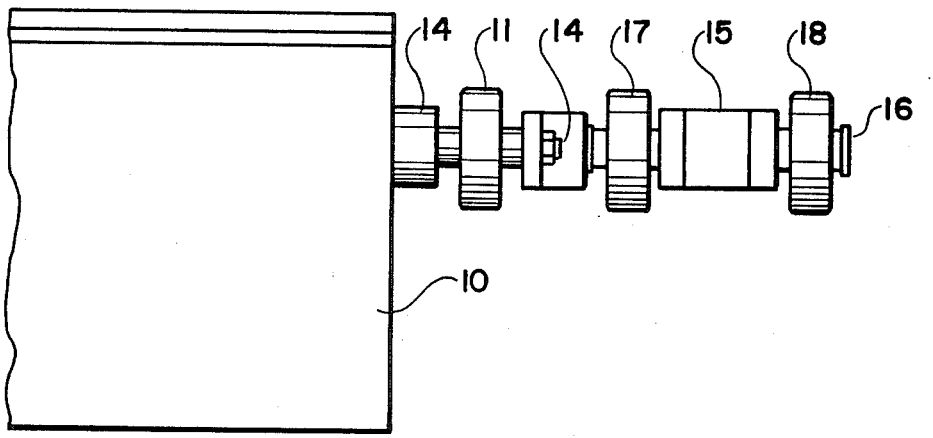

Referring now specifically to the drawings, in FIGS. 1, 2 and 3 each bucket 10 of the bucket elevator carries a trunion 13 and is pivoted by a bucket pin 14 to a swinging link 12. The bucket pins 14 each carry a roller 11 for contact with guidance means or a cam track as will be described later.

A driven chain 15 has a shaft 16 passing through the junction of a pair of links 12 of chain. The swinging link 12 is pivoted to one end of the shaft 16 and shaft 16 also carries a pair of chain rollers 17 and 18. This assembly of shaft 16 and swinging link 12 is repeated every fourth link in the chain 15 so as to support the buckets 10, as illustrated in FIG. 4.

Figure 4:
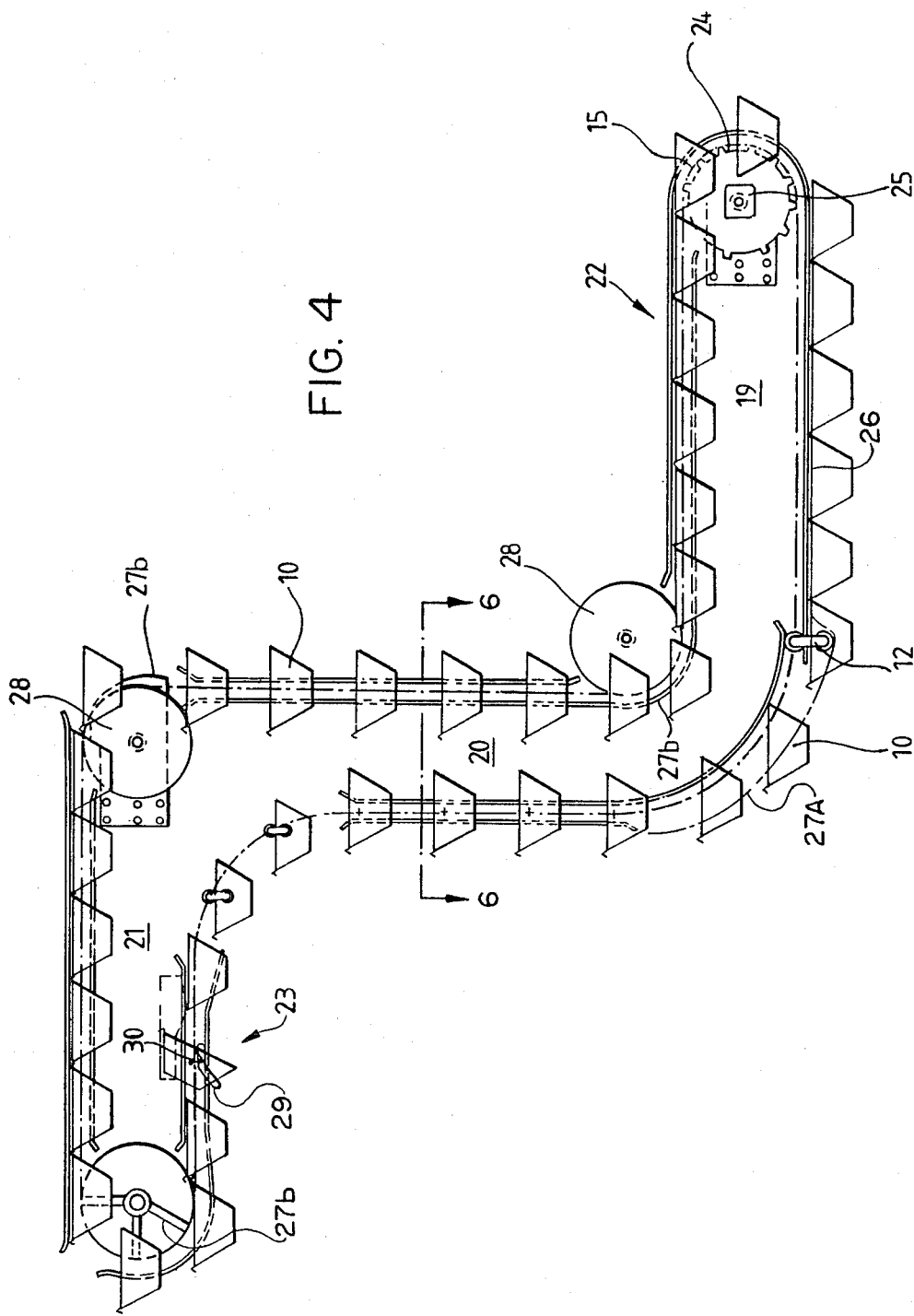
FIG. 4 is a schematic side elevation of a bucket elevator showing the buckets supported from a chain.

The bucket elevator shown in FIG. 4 comprises a horizontal section 19, a vertical section 20 and an upper horizontal section 21. The material is loaded into the bucket 10 at loading station 22 and discharged at discharge section 23.

The chain 15 is driven by a sprocket 24 in turn driven by an electric motor 25.

Figure 5:
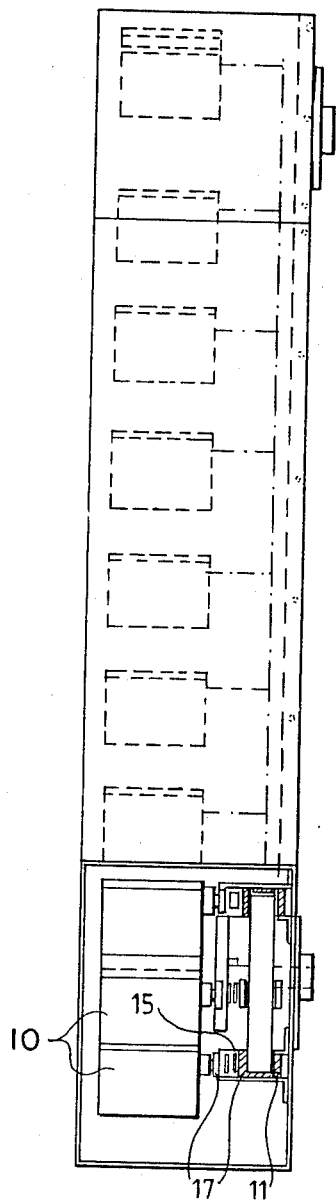
FIG. 5 is an end elevation of the elevator shown in FIG. 4.
Figure 6:
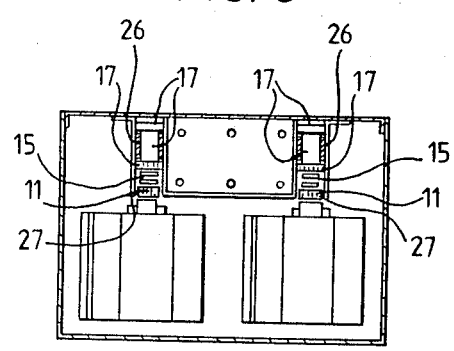
FIG. 6 is a section on line 6—6 of FIG. 4.

Chain rollers 17 run in a closed track 26 and rollers 11 run in a closed track 27 (see FIGS. 5 and 6). At curved parts of the conveyor path the track 27 is arranged to diverge away from track 26 (see for example section 27A of track 27 in FIG. 4).

When the buckets are proceeding along a straight portion such as horizontal section 19 or on a vertical portion such as 20, the swinging links 12 will remain parallel with the tracks 26 and 27. However, when the tracks diverge as at section 27A the rollers 11 will follow the diverging path 27A and cause the links to swing so that the buckets 10 move away from track 26 in an outward direction. As seen at 27A, the path created by the diverging portion of the track 27 is of greater radius than the track 26. Thus the buckets 10 are caused to follow the curve of greater radius and therefore separate from each other during their passage round the bend. The buckets 10 can thus proceed round the bend while maintaining their horizontal attitude without interfering with each other.

The diverging portion of track 27A may as at 27B be supported by a circular plate 28 of greater diameter than the sprocket round which the chain is carried at each curve. Each of the curves may be configured in the same way so that the path 27 diverges from the path 26. The particular shape of the diverging part will depend upon the curvature of the bend and other factors.

At the discharge station 23 a cam 30 located on each bucket contacts a discharge ramp 29 causing the bucket 10 to tip and discharge. The cam 30 is so arranged as to cause the bucket to pivot through approximately 100° of arc and dislodge its load. The ramps or tipping positions can be at one or several different positions and can be remotely controlled through an air cylinder 33 or hydraulic rams or solenoids or actuators of various types.

Figure 8:
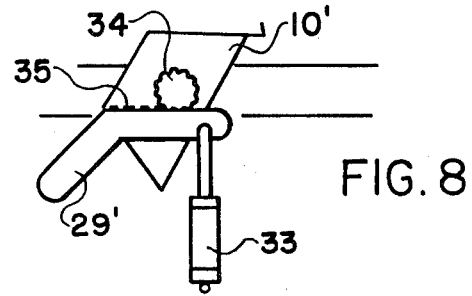
FIG. 8 shows a means of discharging the bucket alternate to that shown in FIGS. 4 and 7.

Alternately, a bucket 10' can be provided with a stationary sprocket 34 affixed to one side instead of a cam 30. As bucket 10' moves through the discharge section 23, sprocket 34 engages a rack 35, causing the bucket 10' to tip forward and discharge its contents. This alternate discharge means is shown in FIG. 8.

Filling can take place at any horizontal position as the buckets are always in close proximity to each other or overlapped on all horizontal runs.

Because the buckets 10 are always substantially horizontal, except when being emptied, any material that remains in the bucket after it has been emptied will not fall out during the return of the buckets to the filling position as happens in known elevators where the buckets very often return in an inverter position to the filling station.

The chain 15 shown in FIG. 3 may be a standard 3" pitch hollow bearing pin type chain made in carbon steel, special plastic, stainless steel or treated carbon steel. The rollers 17, which are of greater diameter than the chain link depth can be in carbon steel, stainless steel, nylon or other materials which will assist in lubrication and maintenance.

A single chain can be used or a twin chain unit may be used.

Although as shown applied to a bucket elevator the principles of this invention may equally well be applied to any conveyor system where buckets or other conveyor devices have to pass around bends.

I claim:

1. An elevator or conveyor system comprising a series of buckets supported by a driven chain or cable along a predetermined path, each bucket being supported on the chain or cable by means of an individual swinging link, each said swinging link being pivotally attached to the chain or cable at one end thereof and pivotally supporting the bucket at the opposite end thereof, guidance means being provided throughout the path, said guidance means including a first guide which guides the chain or cable and a second guide which engages the opposite end of said swinging link, said first and second guides being substantially parallel throughout the path except at a vertical curve or bend in the path where said second guide diverges from said first guide while engaging said swinging link to cause the link to swing outwardly away from the chain or cable independent of the chain or cable movement so that the buckets in turn move independently outwardly and follow a diverging.

2. A system according to claim 1 in which the buckets are arranged to be close together along the straight portions of the path but to separate when the buckets go round a curve or bend.

3. A system according to claim 1 and in which the buckets are maintained in a substantially horizontal attitude at all times except when the contents are being discharged.

4. A system according to claim 1 and in which discharge means are provided to empty the buckets comprising a cam located alongside the path of the chain or cable and a corresponding cam follower on each bucket to cause the bucket to tip and empty when the cam follower engages the cam.

5. A bucket elevator according to claim 1, wherein at least one swinging link carrying each bucket includes a cam follower or roller at said opposite end thereof, and wherein said second guide includes a guide track for receiving said roller and for diverting said cam followers or rollers away from the path of the chain or cable at the bends or turns in the path.

6. An elevator according to claim 5 and in which each of the swinging links is connected to a bucket by means of a bucket pin and the pin carries the roller.

7. An elevator according to claim 6 and in which additional rollers are employed for chain guidance carried on a shaft which performs the additional function of acting as the pivot point for the swinging link where it is pivoted to the chain.

8. An elevator according to claim 5 which is of the self-contained type provided with a loading station and an unloading station and a driven chain having a vertical section so as to raise the buckets from the loading station to the unloading station.

* * * * *